J. LOFTIN.
Device for Upsetting Tires.

No. 234,918.  Patented Nov. 30, 1880.

Witnesses:
Wm Humphreys,
Henry Bell.

Inventor:
John Loftin.

UNITED STATES PATENT OFFICE.

JOHN LOFTIN, OF THOMASVILLE, MISSOURI.

DEVICE FOR UPSETTING TIRES.

SPECIFICATION forming part of Letters Patent No. 234,918, dated November 30, 1880.

Application filed November 17, 1879.

*To all whom it may concern:*

Be it known that I, JOHN LOFTIN, of Thomasville, in the county of Oregon and State of Missouri, have invented certain Improvements in Apparatus for Upsetting Wagon-Tires, of which the following is a specification.

My invention relates to apparatus for upsetting wagon-tires; and it consists in an anvil provided with teeth or serrations and an intermediate plane face, a double stirrup to straddle the tire and anvil and hold the former upon the teeth, and a wedge or key to draw the stirrup firmly down upon the tire.

Figure 1:
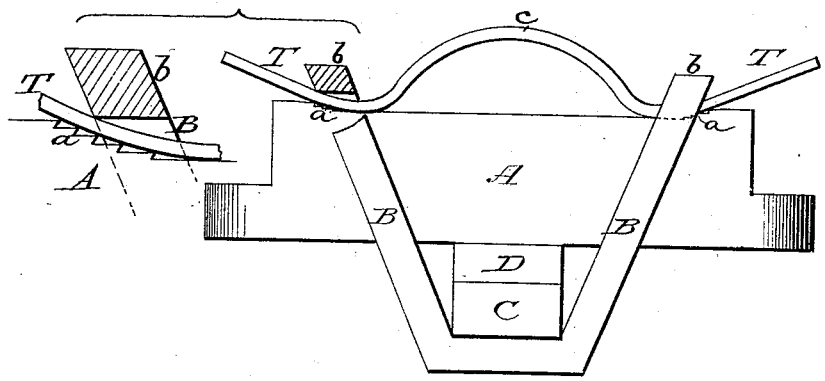
Figure 2:
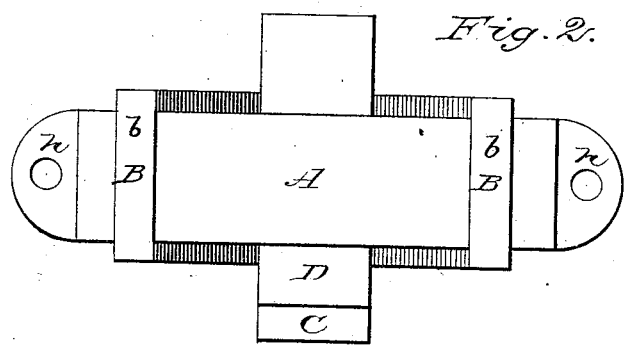
Figure 3:
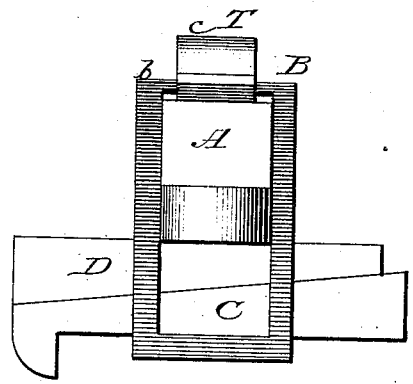

In the accompanying drawings, Figure 1 represents a side elevation of my improved device, showing the tire in position for upsetting; Fig. 2, a top-plan view of the same with the tire removed; Fig. 3, an end elevation, and Fig. 4 a perspective view of the stirrup or clamp detached.

A represents the anvil, which, as shown in Fig. 1, has a plane face extending from the middle each way nearly to the ends, where it meets a series of serrations or ribs, $a$, gradually rising above the level face of the anvil, as shown. The anvil is also formed with ears or lugs provided with holes $h$, to receive bolts or screws by which to fasten the anvil to a block or support. The serrations or teeth $a$ are designed to prevent the slipping of the tire, which, previous to being placed upon the anvil A, is heated and bent, as shown at $c$ in Fig. 1, T representing the tire.

Figure 4:
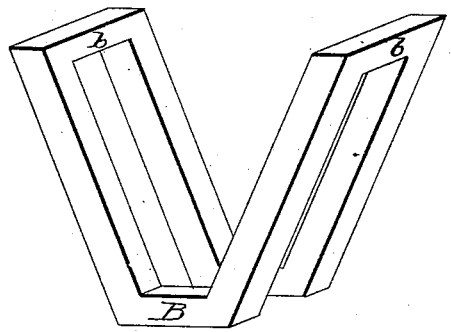

In order to hold the tire firmly upon the anvil and in contact with the serrations or teeth $a$, I provide a double stirrup or clamp, B, of the form shown in Fig. 4, said stirrup consisting of two V-shaped portions, one to extend downward upon either side of the anvil, the upper extremities of said V-shaped portions being connected by cross-bars $b$, as shown.

In using the device the tire, heated and bent as above mentioned, is placed upon the anvil, as in Fig. 1. The stirrup or clamp B is then applied, as shown in Figs. 1, 2, and 3, the cross-bars $b$ lying across the tire and holding the latter upon the serrations or teeth $a$, and the V-shaped portions extending downward on opposite sides of the anvil and sufficiently below the same to permit a gib, C, and wedge or key D to be passed transversely beneath the anvil through the depending arms of the stirrup. By forcing the wedge firmly to its place the tire may be held so securely upon the serrations or teeth as to prevent any outward movement beneath the stirrup. When thus held the upsetting is effected by simply hammering or pressing down the bent portion $c$ to the face of the anvil.

Having thus described my invention, what I claim is—

1. The combination of the base or anvil to sustain the tire, the stirrup constructed in the V form and adapted to clamp the tire at two points, and a tightening device, substantially such as described, to draw the stirrup downward.

2. In combination with the anvil having serrations $a$, the double stirrup B, gib C, and wedge D, substantially as and for the purpose set forth.

JOHN LOFTIN.

Witnesses:
- L. F. PARKER,
- W. G. POMEROY.